(12) United States Patent
Ookaze

(10) Patent No.: US 10,088,834 B2
(45) Date of Patent: Oct. 2, 2018

(54) CONTROL SYSTEM HAVING FUNCTION FOR OPTIMIZING CONTROL SOFTWARE OF NUMERICAL CONTROLLER IN ACCORDANCE WITH MACHINING PROGRAM

(71) Applicant: FANUC Corporation, Minamitsuru-gun, Yamanashi (JP)

(72) Inventor: Yuusuke Ookaze, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 266 days.

(21) Appl. No.: 14/992,331

(22) Filed: Jan. 11, 2016

(65) Prior Publication Data

US 2016/0209835 A1    Jul. 21, 2016

(30) Foreign Application Priority Data

Jan. 16, 2015    (JP) ................................ 2015-007037

(51) Int. Cl.
*G05B 19/4155*    (2006.01)

(52) U.S. Cl.
CPC ............. *G05B 19/4155* (2013.01); *G05B 2219/34325* (2013.01)

(58) Field of Classification Search
CPC ................ G05B 19/4155; G05B 2219/34325
See application file for complete search history.

(56) References Cited

U.S. PATENT DOCUMENTS

| 2002/0049512 | A1 | 4/2002 | Mizuno et al. |
| 2013/0125091 | A1 | 5/2013 | Hashimoto et al. |
| 2015/0012120 | A1 | 1/2015 | Yoshimura |

FOREIGN PATENT DOCUMENTS

| CN | 101458620 A | 6/2009 |
| CN | 103106119 A | 5/2013 |
| DE | 102014108964 A1 | 1/2015 |
| JP | S59-60642 A | 4/1984 |
| JP | H04-333102 A | 11/1992 |
| JP | H07-36529 A | 2/1995 |
| JP | H09-244727 A | 9/1997 |
| JP | H09-288580 A | 11/1997 |
| JP | 2000-122871 A | 4/2000 |
| JP | 2001-147820 A | 5/2001 |
| JP | 2002-229803 A | 8/2002 |
| JP | 2003-216434 A | 7/2003 |

OTHER PUBLICATIONS

Notification of Reasons for Refusal dated Nov. 22, 2016 in Japanese Patent Application No. 2015-007037 (3 pages) with an English Translation (3 pages).

(Continued)

*Primary Examiner* — Joseph C Nicely

(74) *Attorney, Agent, or Firm* — Drinker Biddle & Reath LLP

(57) ABSTRACT

A control system calculates a use frequency of a function used by a control program based on the control program (and a use history of the control program), and generates an optimized source code by optimizing a source code of control software based on the calculated use frequency. Based on the generated optimized source code, optimized control software is generated and transferred to the execution environment of the control software.

3 Claims, 4 Drawing Sheets

(56) References Cited

OTHER PUBLICATIONS

The Notification of the First Office Action dated Jan. 26, 2018 in Chinese Patent Application 201610028607X (6 pages) with an English translation (8 pages).

German Office Action, along with its English-language translation, dated Jul. 23, 2018, that issued in German patent application No. 10 2016 000 213.1 is attached.

CONTROL SYSTEM HAVING FUNCTION FOR OPTIMIZING CONTROL SOFTWARE OF NUMERICAL CONTROLLER IN ACCORDANCE WITH MACHINING PROGRAM

RELATED APPLICATION DATA

This application claims priority under 35 U.S.C. § 119 and/or § 365 to Japanese Application No. 2015-007037 filed Jan. 16, 2015, the entire contents is incorporated herein by reference.

BACKGROUND OF THE INVENTION

1. Field of the Invention

The present invention relates to a numerical controller, and in particular, relates to a numerical controller having a function for optimizing control software of the numerical controller in accordance with a machining program.

2. Description of the Related Art

Control software of a numerical controller interprets the machining program and creates a move command to a motor to operate a machine tool. A program that interpolates and executes programming language is generally called an interpreter.

For speeding up of the interpreter, a method has been devised that prepares in advance a plurality of interpreter sets in which modules are arranged to maximize cache efficiency of a particular instruction group, and examines instructions used in a program, and selects and executes the interpreter sets that operates the fastest among the prepared interpreter sets (for example, see JP 2002-229803 A).

In addition, for speeding up of operating software itself and reduction of amount of memory required, a method has been devised that sends user profile data to a server, and creates software in which reduction of an unnecessary module and fixation of variables have been performed based on the user profile data sent in the server, and downloads the software to a small-sized information equipment to execute the software (for example, see JP 2003-216434 A).

Further, a method has been devised, for distributing application software using a compile server, that creates software matched to a client based on client information sent from the client and distributes the software (for example, see JP 2000-122871 A).

The numerical controller has many preparatory functions (G code) and auxiliary functions (M code) to apply to various machine tools, and further, new functions have been added successively with an increase in functions required for the machine tools. By an increase in a conditional branch instruction by addition of those functions, a problem has frequently occurred that causes a decrease in processing speed, such as a pipeline stall and a cache mistake.

The above described JP 2002-229803 A discloses a technique that takes statics of commands that are selected and used so that they cover variations of the programs considered from typical programs (benchmark, network application, graphics application, and the like), and classifies the commends into a plurality of types of instruction groups taking into consideration a specification of a processor to be used, too, and then creates in advance an interpreter set to maximize the cache efficiency for each of the types. In this method, since creation of the software is required in a stage where it is not grasped what kind of functions are actually used in the program, it is not possible to address problems such as the pipeline stall caused by the conditional branch instruction. In addition, since preparation of a plurality of pieces of software is required, there is a problem that many resources are required and it is not suitable for the numerical controller having limited usable resources.

Further, in a technique devised in the above described JP 2003-216434 A, deletion of the unnecessary module and the fixation of variables are performed based on the user profile data, such as information on weather in a particular region desired by the user, and preference of users such as whether the user likes a text based interface or a graphics based interface. Although the problem such as the pipeline stall no longer occurs since there is no conditional branch instruction itself by the fixation of the variable and the like, some of the functions become unusable since processing itself is deleted. Accordingly, there is a problem that a function desired to be used cannot be immediately used on the spot when the function is changed if the numerical controller is not connected to a network. That is, when the similar method is applied to the numerical controller, it is considered that a problem occurs that operation becomes impossible when the parameter and the machining program are changed.

In addition, although conventionally there is the method devised in JP 2000-122871 A as the method for distributing optimal software to the client using the compile server, a method for optimizing control software of the numerical controller is not disclosed, and a system cannot be realized for distributing control software of an optimized numerical controller using the compile server.

SUMMARY OF THE INVENTION

Accordingly, an object of the present invention is to provide a control system having a function for optimizing control software of a numerical controller in accordance with a machining program.

The control system according to the present invention includes: an execution environment of control software that analyzes a control program and executes processing for outputting control information on a machine as a control object; a control program reception unit that receives the control program and a use history of the control program; a use frequency calculation unit that calculates a use frequency of a function used by the control program based on the control program, or on the control program and the use history of the control program; a source code optimization unit that optimizes a source code of the control software to generate an optimized source code based on the use frequency of the function used by the control program that is calculated by the use frequency calculation unit; a control software generation unit that generates optimized control software based on the optimized source code; and a control software transfer unit that transfers the optimized control software to the execution environment of the control software.

An execution environment of the control software may be a controller or a server that outputs the control information to the controller.

With the present invention, since a cache mistake and a pipeline stall due to a branch prediction mistake are decreased, it becomes possible to execute a machining program faster.

BRIEF DESCRIPTION OF THE DRAWINGS

The above described and other objects and features of the present invention will be apparent from the following description of examples with reference to the accompanying drawings. Among those drawings.

DETAILED DESCRIPTION OF THE PREFERRED EMBODIMENTS

Embodiments of the present invention are described below with reference to the drawings. First, a technical outline of the present invention is described.

The present invention allows optimization of a conditional branch instruction by preparing an optimized application having a compiler and a linker, transferring to the optimized application a machining program used in a machine tool and a use history of the machining program, and performing optimization of control software based on the result of checking of functions actually used.

Figure 1:
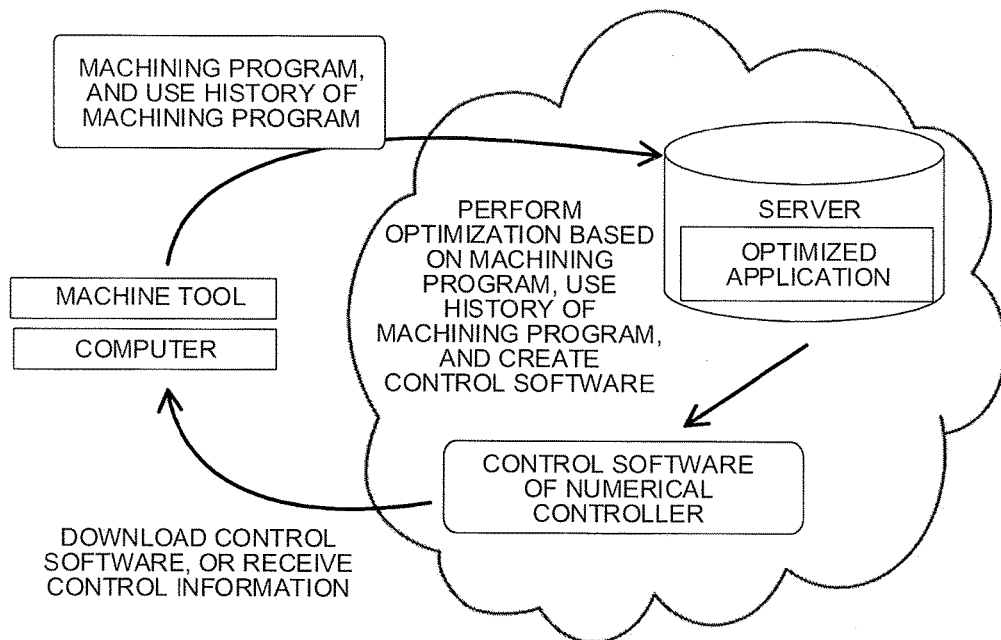
FIG. 1 is a schematic diagram of a control system in case where an optimized application of the present invention is provided on a server on a network.
Figure 2:
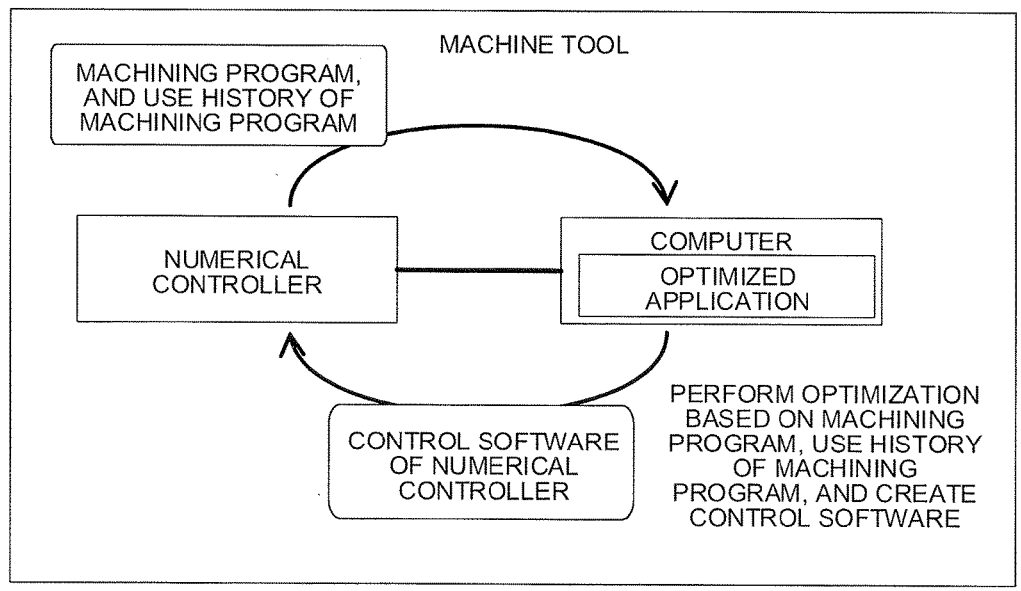
FIG. 2 is a schematic diagram of a control system in case where the optimized application of the present invention is provided on a computer connected to a numerical controller.
Figure 3:
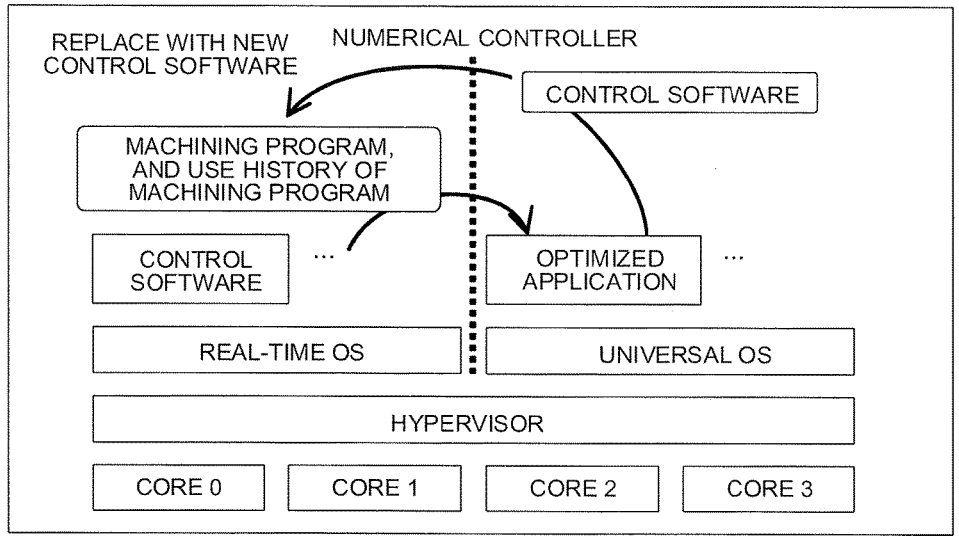
FIG. 3 is a schematic diagram of a control system in case where the optimized application of the present invention is operated on multicore of the numerical controller.

Thus, optimal control software in accordance with the machining program can be used without preparing in advance a plurality of pieces of control software. The optimized application can be in a server on a network as illustrated in FIG. 1, and also can be in a computer connected to a numerical controller or a computer integrated with the numerical controller as illustrated in FIG. 2. In addition, in a case where the numerical controller in a multicore configuration has many resources in the future, the optimized application can be operated on an operating system that operates in a core different from a core used by an operating system operating the control software, as illustrated in FIG. 3.

Even when the optimization of the control software is performed using the server on the network, there is a possibility that operation becomes slow since a conditional branch instruction remains in the control software. But, even in an environment in which the network may be disconnected, it becomes possible to perform operation with a parameter or the machining program changed.

For example, when creation of control software in accordance with a new machining program is desired, even in a poor network environment in a place where the machine tool is located is poor which will not allow connection to the server, it is possible to perform operation using a control software optimized for the other machining program that has been already installed at the time in a controller of the machine tool, although operation may become slow because the control software is not made exclusively for the new machining program, since the processing itself has not been not deleted as in the prior art described in JP 2003-216434 A.

Incidentally, when the numerical controller is stably connected to the network at all times, it becomes possible to use the optimal control software in accordance with the machining program even in a machine tool whose resources are limited, by operating the control software created for each machining program in the server on the network and receiving control information in the numerical controller. Even when the control software is used like this, since original control software remains placed in the numerical controller, operation using the original control software placed in the numerical controller is possible even when the network is disconnected by any chance.

A procedure for generating the optimal control software of the present invention is described below. In a control system of the present invention, a machining program and a use history of the machining program, if such a use history exists, are transferred from the machine tool or a computer equipped with CAD/CAM to the optimized application.

The optimized application analyzes the machining program sent and calculates a use frequency of each of the functions, such as a preparatory function and an auxiliary function, and a relationship among the functions (order of use, etc.). When the use history of the machining programs, as well as a plurality of machining programs, are sent, weighting by the number of times of use is performed to calculate a more accurate use frequency, and actual timing of a call of each of the functions is analyzed to calculate more accurate relationship among the functions. Then, a source code is optimized based on a calculated result, and compiling and linking are performed to create the control software of the numerical controller. The control software can be used by actually being installed to the numerical controller, and also can be operated in the server on the network so that the numerical controller receives the control information.

Optimization processing of the control software of the present invention is described below. In this connection, it should be noted that the optimization processing of the present invention is not limited to the examples described below, and it is possible to appropriately apply an optimization technique of the source code to which the machining program and the use history of the machining program can be applied based on the analysis result.

Optimization Example 1

Figure 4:
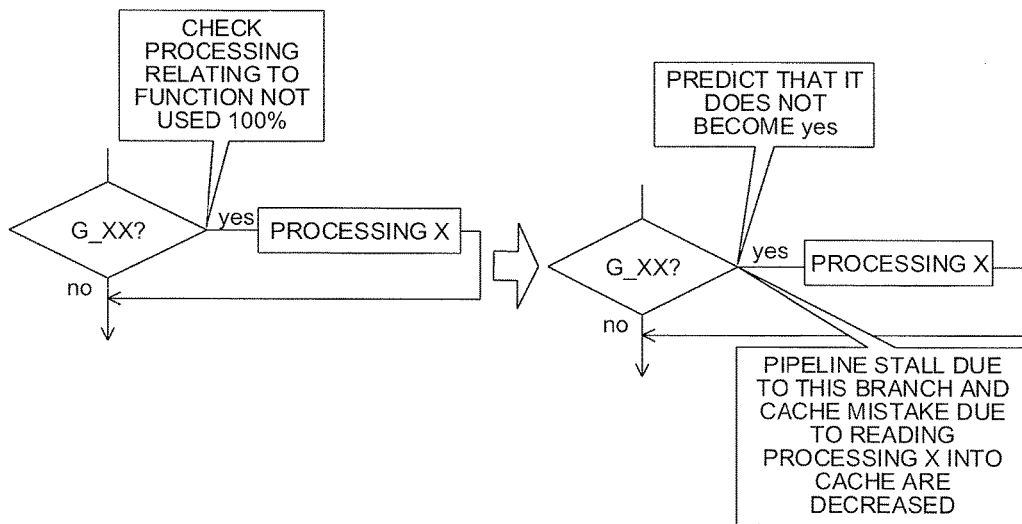
FIG. 4 is a diagram illustrating optimization example 1 of the present invention.

In check processing relating to the functions such as the preparatory function and the auxiliary function, a hint of a branch prediction is given to the conditional branch instruction in a case where an operation is expected to be faster when such hint is given, depending on the use frequency of the functions such as the preparatory function and the auxiliary function and accuracy of an dynamic branch prediction of the processor to be used. For example, as illustrated in FIG. 4, in processing for checking whether the function not used 100% is valid or invalid, since the branch prediction mistake can be decreased by giving the hint to make the function invalid, it becomes possible to decrease occurrence of the pipeline stall and the cache mistake due to reading instructions not originally required to be executed into the cache. As an example of how to give the hint, for example in a case of C language, it is possible to give the hint using a built-in function of the compiler, such as _builtin_expect( ).

Optimization Example 2

Figure 5:
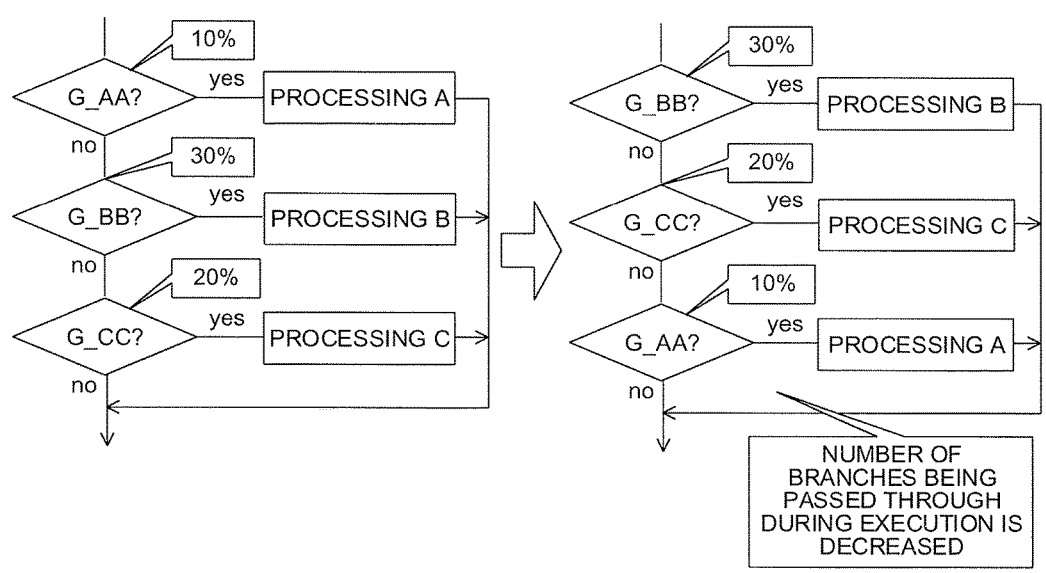
FIG. 5 is a diagram illustrating optimization example 2 of the present invention.

As illustrated in FIG. 5, in an if-elseif-else statement that branches in accordance with the functions such as the preparatory function and the auxiliary function, order is rearranged so that a frequently used function is checked at the beginning. Since the number of the conditional branch instructions itself being passed through during execution is decreased by previously checking a more frequently used function, it becomes possible to reduce speed degradation due to the conditional branch instruction.

Optimization Example 3

It becomes possible to reduce the cache mistake and a TLB mistake by devising such as changing arrangement on the memory of modules relating to the functions such as the preparatory function and the auxiliary function in accordance with the use frequency of the function, and arranging modules frequently used at the same time so that they are located near each other on the memory.

Figure 6:
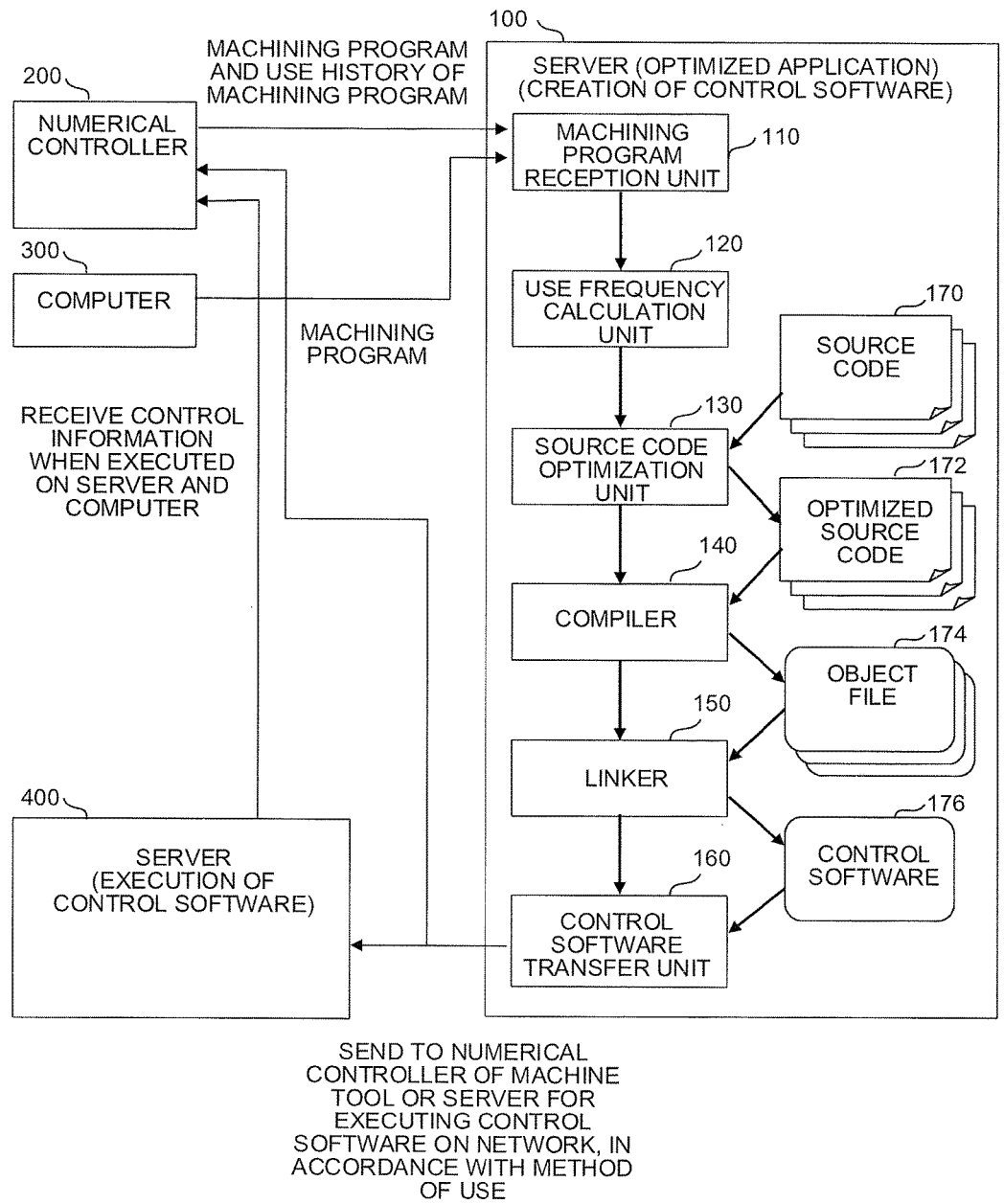
FIG. 6 is a block diagram of a control system of one embodiment of the present invention.

FIG. 6 is a functional block diagram of a control system in one embodiment of the present invention. In FIG. 6, an example is illustrated in which an optimized application is provided in a server 100 on the network.

The control system in the present embodiment is configured of a server 100 in which the optimized application is provided, a numerical controller 200, a computer 300 equipped with CAD/CAM, and a server 400 that is an execution environment of the control software, which are connected to each other via the network.

The server 100 includes a machining program reception unit 110, a use frequency calculation unit 120, a source code optimization unit 130, a compiler 140, a linker 150, and a control software transfer unit 160.

The machining program reception unit 110 receives a machining program and information on a use history of the machining program, if such a use history exists, from the numerical controller 200 or the computer 300.

The use frequency calculation unit 120 analyzes the machining program and the information on the use history of the machining program received by the machining program reception unit 110, and calculates the use frequency of the functions such as the preparatory function and the auxiliary function and the relationship among the functions (order of use, etc.).

The source code optimization unit 130 reads a source code 170 of the control software stored in a memory (not illustrated), and applies the optimization processing described above to the source code to generate an optimized source code 172 based on the use frequency of the functions such as the preparatory function and the auxiliary function and the relationship among the functions calculated by the use frequency calculation unit 120.

The compiler 140 compiles the optimized source code 172 generated by the source code optimization unit 130 to generate an object file 174, and the linker 150 links the generated object file 174 to generate an optimized control software 176.

Then, the control software transfer unit 160 transfers the generated optimized control software 176 to the execution environment of the control software. The execution environment to be the destination of the control software, in accordance with a method of use of the control software 176, is the numerical controller 200 of the machine tool when the control software is directly executed by the numerical controller 200, and is the server 400 in a case of a method for executing the control software 176 is on the network.

The embodiments of the present invention have been described above. The present invention is not limited to the examples of the embodiments described above and can be implemented in the other form by adding appropriate modifications.

For example, although, in the example described above, the machining program and the use history of the machining program are analyzed for optimization, information (a type and an architecture of a CPU, memory structure, etc.) relating to an operating environment of the control software may be additionally acquired for optimization of the source code.

The invention claimed is:

1. A control system including an execution environment of control software that analyzes a control program and executes processing for outputting control information on a machine as a control object, the control system including at least one processor and a memory that stores instructions, when executed by the at least one processor, performs a method comprising:
    receiving the control program and a use history of the control program;
    calculating a use frequency of a function used by the control program based on the control program, or on the control program and the use history of the control program;
    optimizing a source code of the control software to generate an optimized source code based on the calculated use frequency of the function used by the control program;
    generating optimized control software based on the optimized source code; and
    transferring the optimized control software to the execution environment of the control software.

2. The control system according to claim 1, wherein the execution environment of the control software is a controller.

3. The control system according to claim 1, wherein the execution environment of the control software is a server that outputs the control information to a controller.

* * * * *